United States Patent [19]

Dimeff et al.

[11] Patent Number: 4,471,651
[45] Date of Patent: Sep. 18, 1984

[54] DUCT PROBE AND DISPENSING APPARATUS THEREFOR

[75] Inventors: John Dimeff; Clyde R. Stewart, both of San Jose, Calif.

[73] Assignee: Mark Telephone Products, Inc., Santa Clara, Calif.

[21] Appl. No.: 441,019

[22] Filed: Nov. 12, 1982

[51] Int. Cl.³ .............................................. G01M 3/08
[52] U.S. Cl. .................................. 73/40.5 R; 242/129
[58] Field of Search ..................... 73/40.5 A, 40.7, 40, 73/592, 40.5 R; 242/105, 129; 254/134.3 FT

[56] References Cited

U.S. PATENT DOCUMENTS

| | | | |
|---|---|---|---|
| 2,210,417 | 6/1940 | Kinley | 73/40.5 A |
| 2,909,975 | 10/1959 | Ulrich | 73/40.5 R |
| 3,162,394 | 12/1964 | Culpepper et al. | 242/105 X |
| 3,168,824 | 2/1965 | Florer et al. | 340/605 X |
| 3,309,039 | 12/1965 | Rutty | 242/128 |
| 3,363,450 | 1/1968 | Simpkins et al. | 73/40.5 A |
| 3,400,574 | 9/1968 | Cramer | 73/40.5 R |
| 3,556,431 | 1/1971 | Freitag | 242/129 |
| 4,372,161 | 3/1983 | De Buda et al. | 73/623 |

FOREIGN PATENT DOCUMENTS

| | | | |
|---|---|---|---|
| 3013465 | 10/1981 | Fed. Rep. of Germany | 73/40.5 A |
| 87933 | 7/1980 | Japan | 73/40.5 A |

*Primary Examiner*—Anthony V. Ciarlante
*Assistant Examiner*—Hezron Williams
*Attorney, Agent, or Firm*—Townsend and Townsend

[57] ABSTRACT

A duct probe having a coaxial cable is provided to advance a microphone through an underground or other duct containing a cable in a pressurized sheath for sensing fluid leaks in the sheath. The coaxial cable is embedded in a resilient fiberglass rod of one-piece construction. The rod is sufficiently flexible so that it can be wound onto and unwound from a reel having a cage-like configuration. A stationary base is provided to rotatably mount the reel, and the base is provided with a length measuring device responsive to the movement of the duct probe as it is unwound from the reel so that the distance by which the duct probe penetrates a duct can be determined. At the outer end of the rod, a microphone is mounted for sensing the sounds caused by a fluid leak in the pressurized sheath in the duct. The coaxial cable in the rod couples the microphone to a telephone jack at the reel, one part of the jack being stationary and the other part of the jack being coupled to the reel so that the reel can rotate relative to the base, yet a signal can be taken from the coaxial cable and directed to a electronic signal processor unit for showing an indication of the leak. The rod can be repaired quickly and easily by an improved technique if the rod cracks as a result of being misused.

26 Claims, 9 Drawing Figures

FIG. I
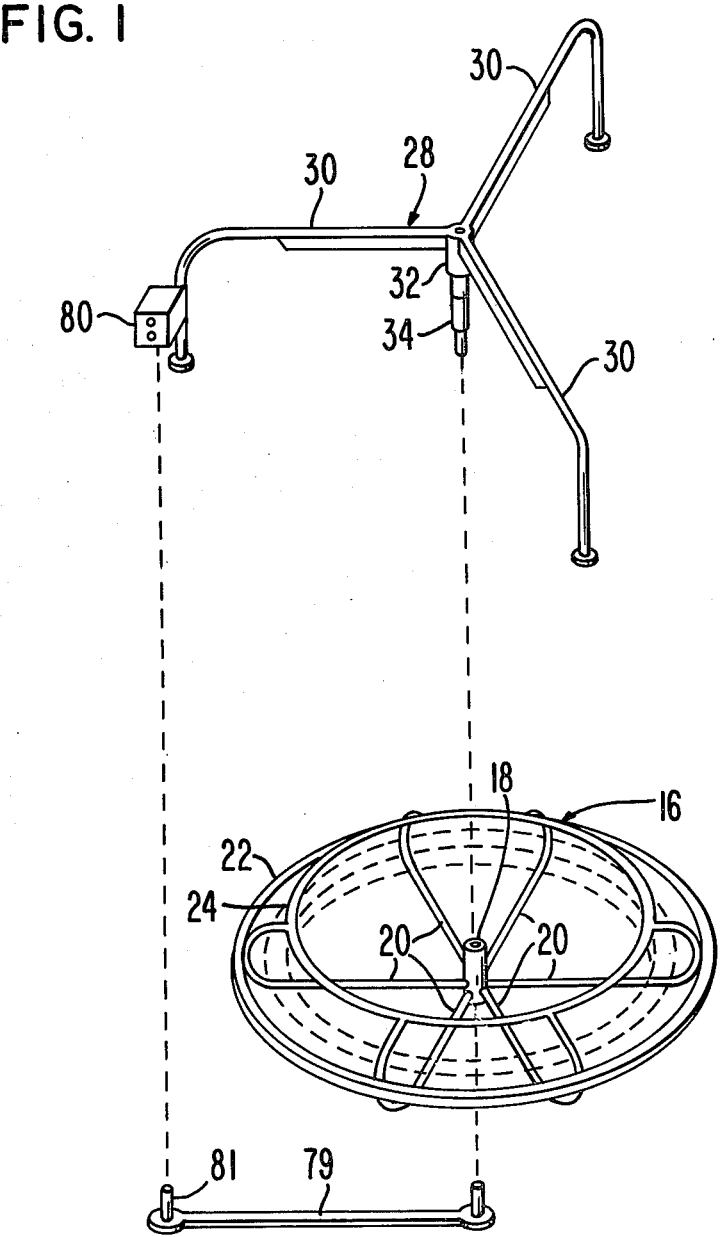
FIG. 2
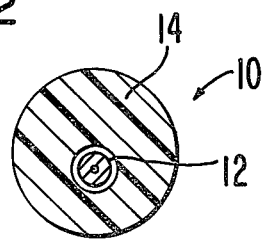

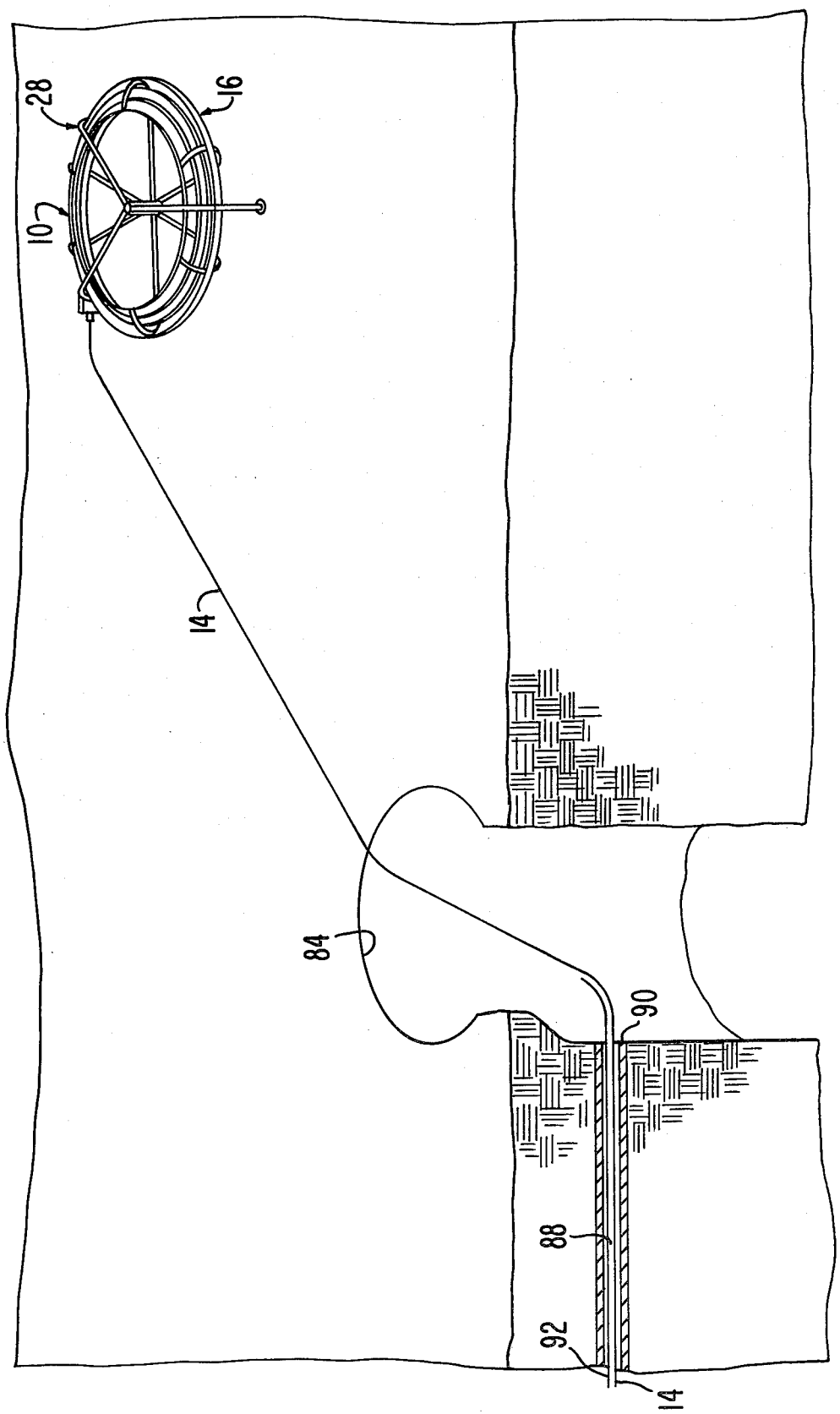

DUCT PROBE AND DISPENSING APPARATUS THEREFOR

This invention relates to apparatus for locating leaks in pressurized, underground cables, such as telephone cables.

Telephone cables are placed in underground ducts for connecting distant points to a central station. Typically, such a cable includes a sheath which surrounds a number of electrical conductors and is pressurized, usually with air, to maintain the electrical integrity of the conductors.

When a pressurized cable sheath develops a small leak, the escaping air generates an a fluctuating pressure signal. The frequency of the signal is typically in the range of 100 Hz to 100 kHz. This signal can be detected with a suitable sonic sensor which is, in effect, a microphone. When the microphone senses the ultrasonic signal, it transmits a corresponding electronic signal along a long mechanical rod used to position the microphone within the duct, and through a coaxial cable contained within that rod to a detection indicator located outside the duct and some distance from the location of the leak.

Existing probe equipment in this field, such as the Hewlett-Packard Model 18100A Duct Probe, has involved the use of number of straight, metallic rod segments which are grooved to accept a close-fitting coaxial cable. The rod segments are assembled one-by-one at a job site to form the probe, and the resulting probe can be as long as 500-feet. Damage to the cable due to breakage at a joint between two rod segments requires replacement of the full length of cable or removal of the rod segments and cable from a duct for repair of the cable. Such assembly of the rod segments and placement of the cable in the grooves of the rod requires considerable time and effort.

A workman using the conventional probe described above must be required to keep track of a large number of rod segments, connectors, springs and clips, and must be sure to align the grooves of the adjacent rod segments properly to receive the coaxial cable. This task must be followed by placing the cable in the grooves without cutting or pinching the cable. Approximately 100 rods are usually required to reach a leak 300 feet from the duct entrance and each rod must be assembled and disassembled individually, then scraped and washed clean to remove the dirt and other foreign matter that collects within the grooves of the rod segments.

Because of the foregoing drawbacks, a need has arisen for an improved duct probe and the present invention fills this need.

SUMMARY OF THE INVENTION

The present invention includes a duct probe having a microphone on the outer end thereof, the probe being in the form of a coaxial cable embedded in a one-piece, flexible, highly resilient rod of suitable material, such as fiberglass. The rod is capable of being wound on a portable reel, and the rod protects the cable at all times yet the rod can be required if it is accidentally damaged due to being misused. Moreover, the rod itself can be of small diameter, such as ⅜-inch so that it can be used in ducts having diameters as small as one inch.

If the rod is made of fiberglass or other suitable material, the outer surface of the rod is smooth, and the rod has a pull strength of more than 400-lbs plus an adequate reserve strength to minimize the chance of breakage. Thus, the probe will be movable readily in either direction through a duct to minimize the time and effort required to insert and retrieve the probe.

A distance measuring device is mounted adjacent to the reel on which the rod is wound, so that the distance from the entrance of a duct to the location of a leak in the duct can be determined with great accuracy. Once this distance has been determined, excavation into the ground can be commenced so that the leak can be reached and the pressurized cable can be repaired.

The present invention provides a duct probe which is made so as to eliminate the need for assembly of individual, grooved rod segments and the placement of a coaxial cable in the grooves of such rod segments. The probe can be made so that the sensing microphone at the outer end of the rod can be quickly and easily removed from or placed on the rod.

The rod can be readily wound onto and unwound from a reel which is rotatably mounted on a stationary base or stand in a manner such that the reel can be rotated on the stand, yet the signal from the coaxial cable in the rod can be transferred directly to a stationary signal processor adjacent to the base. This is accomplished by use of an electrical connector much in the nature of a telephone plug and jack which allows rotation of the reel relative to the stand. The plug is stationary on the axis of rotation of the reel while the jack is carried by the hub of the reel for rotation therewith.

The primary object of the present invention is to provide an improved duct probe for sensing wide band acoustic signals caused by an air leak in a pressurized cable in an underground duct wherein the duct probe includes a resilient rod having a coaxial cable embedded therein and the rod is sufficiently flexible so that it can be wound on a reel rotatably mounted on a stationary stand whereby the probe avoids the need for connecting grooved rod segments and forcing the coaxial cable into the grooves of the segments as is required in the prior art techniques.

Another object of the present invention is to provide a duct probe which is simple and rugged in construction, can be quickly inserted into and removed from an underground duct, yet the length of the duct probe inserted into the duct itself can be quickly determined so that the location of the leak can be established to permit immediate excavation to the source of the leak for purposes of repairing the structure causing the leak.

Another object of the present invention is to provide an improved duct probe of the type described wherein the probe is suitable for use for insertion into ducts which could not be probed by conventional duct probes due to their inflexibility and roughness of the junctions between the rod segments of the probe, yet a leak can be detected with the present invention in a fraction of the time required by conventional equipment and at sensitivities much greater than that obtainable with conventional equipment.

Other objects of the present invention will become apparent as the following specification progresses, reference being had to the accompanying drawings for an illustration of the invention.

IN THE DRAWINGS:

FIG. 1 is a perspective view of the reel and stationary stand forming the holder for the duct probe of the present invention, the duct probe being wound on a rotatable reel and being shown in dashed lines, the reel being separated from a stationary stand;

FIG. 2 is an enlarged, cross-sectional view of the duct probe showing a coaxial cable embedded in a rod;

FIG. 4 is a perspective view of the duct probe, showing the way in which it is inserted into an underground duct through an open manhole, with the reel and stand being on the ground adjacent to the manhole.

Figure 3A:
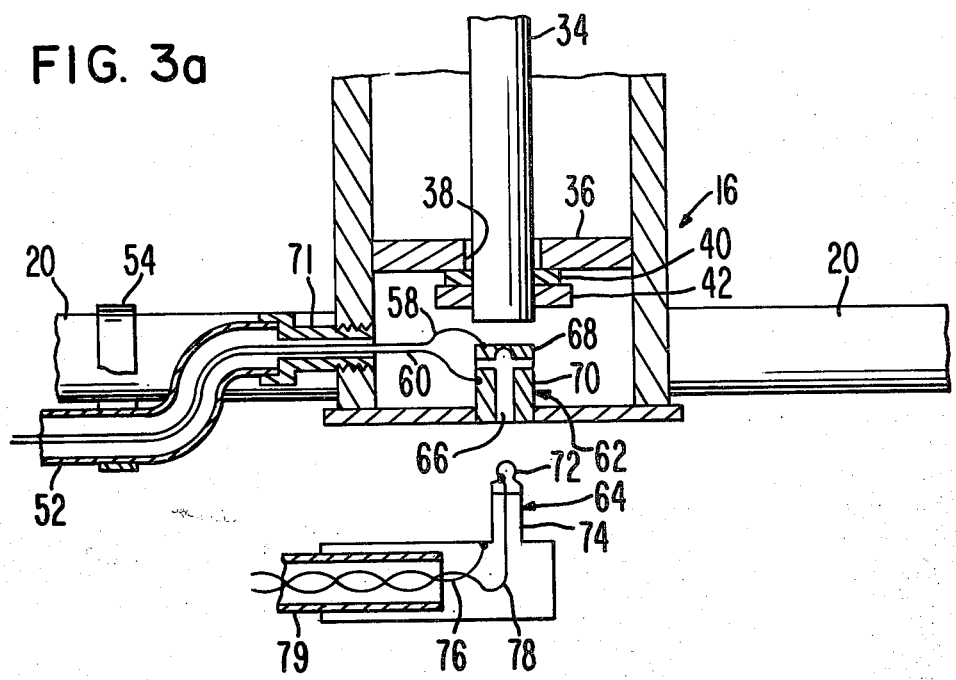
FIG. 3a is an enlarged, fragmentary cross-sectional view of the reel, showing the way in which it is rotatably mounted on the stand and further showing a telephone jack connector for coupling the leads of the coaxial cable in the rod with an electronic signal processor unit at a stationary location adjacent to the stand.

The duct probe of the present invention is broadly denoted by the numeral 10 and includes a coaxial cable 12 embedded in a rod 14 of a suitable material, such as fiberglass. The rod is flexible and highly resilient so that it inherently is biased into a straight line condition yet the rod can be wrapped on a reel in the form of a roll or coil as shown in FIG. 3. Rod 14 has a smooth outer surface and is relatively small in cross-section. Typically the diameter of the rod is about ⅜-inch. Thus, the rod can be moved easily into and out of ducts of small diameter, such as ducts 1-inch in diameter.

A reel 16 is used to contain or carry rod 14 when the same is in the form of a roll as shown in FIG. 3. Reel 16 has a tubular hub 18 and a number of arms 20 secured to and radiating from the hub 18. The arms are curved at their outer ends and are doubled back toward and extend slightly in the direction of hub 18, whereby each arm has a generally J-shaped configuration. A circular, rigid band 22 is secured in any suitable manner, such as by welding or the like, to the outer peripheral extremities of arms 20, and a circular rigid ring 24 is rigidly secured, such as by welding, to the upper ends of the arms 20. The outer, curved ends of legs 20, band 22 and ring 24 effectively define a cage to confine the duct probe 10 within the inner region of the reel yet they allow the duct probe to be pulled out of the coiled condition thereof through the center of ring 24 and away from the reel when the reel is rotatably mounted on a stationary base or stand 28 as shown in detail in FIG. 1.

Stand 28 has a number of L-shaped legs 30 secured to and radiating from a central hub 32. The outer ends of the legs 30 are adapted to engage the ground, while a generally vertical shaft 34 on hub 32 extends downwardly and into hub 18 of reel 16.

Figure 3:
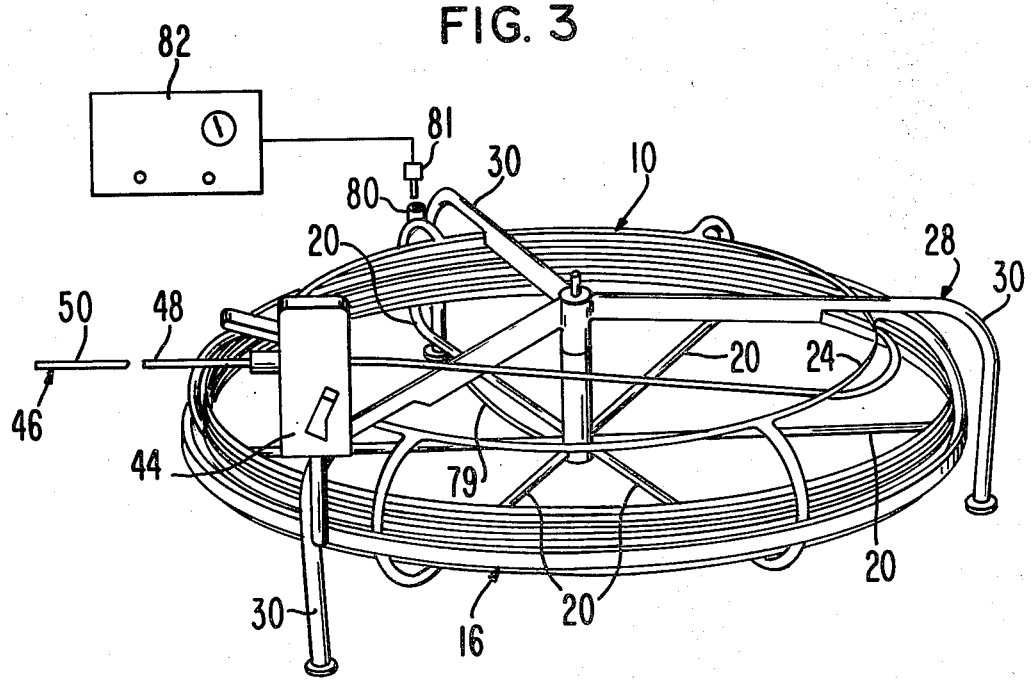
FIG. 3 is a perspective view of the reel coupled to the stand and showing the duct probe wound on the reel, the outer end of the rod of the duct probe having a microphone thereon and the duct probe passing through a distance measuring device coupled to the stand.

FIG. 3a shows the way in which shaft 34 is coupled with hub 18 of reel 16. The hub 18 has an open upper end which receives shaft 34, and a disk or plate 36 is secured to hub 18 near the lower end thereof. Plate 36 has a central hole 38 therethrough for receiving the lower end of shaft 34. A bearing 40 bears against the lower surface of plate 36 and is held in position by a hut 42 threaded on the lower end of shaft 34. Thus, hub 18 can rotate about the central axis of shaft 34 relative to stand 28. Other means for rotatably mounting reel 16 on stand 28 can be provided, if desired.

When duct probe 10 is wound in the form of coil on reel 16 as shown in FIG. 3, the duct probe can be unwound from the reel by pulling it off the reel and through the central part of the ring 24 as shown in FIG. 3. As the duct probe is pulled off the reel, the reel rotates relative to stand 28 since the reel is above the ground on which the legs 30 of stand 28 are mounted.

As the duct probe is unwound from the reel, it passes through a distance measuring device 44 (FIG. 3). The purpose of the device 44 is to measure the length of the duct probe which passes through the device. The device has a suitable indicator (not shown) which shows the length in feet, and this indicator can be set to zero manually. This allows the device to start measuring the length of duct probe 10 when the front end of the duct probe is at the entrance of a duct containing a pressurized cable sheet which is to be tested for leaks.

A microphone 46 is mounted in any suitable manner on the front end of duct probe 10. For instance, rod 14 is provided with an internally threaded sleeve 48, and the body 50 of the microphone has an externally threaded end which is threaded into sleeve 48. The microphone is highly sensitive to sounds in a particular range, such as the range of 100 Hz to 100 kHz. Moreover, the microphone body has seal means (not shown) rendering the microphone moisture proof. Instead of a microphone, an eye hook can be secured to the rod to allow the rod to be used as a fish.

The inner end of the rod, i.e., the end opposite to the end having microphone 46, is adjacent to the outer end of a copper tube 52 (FIGS. 3 and 3a), tube 52 being secured by one or more straps 54 to one of the legs 20. The outer end of the tube 52 is adjacent to the curved part of the adjacent leg 20, while the inner end of the tube is open and empties into hub 18 of reel 16.

The coaxial cable is separated from the rod at the outer end of tubes 52 and the cable passes through the tube 52 as shown in FIG. 3a. The two electrical conductors 58 and 60 forming the coaxial cable are coupled to a jack 62 for receiving a telephone plug 64. Jack 62 has a central opening 66 for receiving plug 64, opening 66 being coextensive with the axis of rotation of hub 18. Leads 58 and 60 are coupled to the two contacts 68 and 70 of jack 62 so that, when plug 64 is in place, the tip 72 of plug 64 electrically engages contact 68, while the main body 74 of plug 64 engages contact 70. A threaded retainer 71 carried by hub 18 stabilizes leads 58 and 60 and tube 52.

The electrical leads 76 and 78 from plug 64 pass through a stationary tube 79 which extends radially outwardly and is coupled to one of the legs 30 of stand 28 near the lower end of the leg. The stiffness of leads 76 and 78 essentially prevents rotation of plug 64 when the latter is in opening 66 of jack 62 and as reel 16 rotates relative to stand 28. In this way, the signal from the coaxial cable in rod 14 can be transferred to leads 76 and 78 which are in turn coupled to a socket 80 which receives a plug 81. An electronic signal processor unit 82 stationed adjacent to stand 28 is coupled by plug 81 to socket 80 so that the signal sensed by the microphone 46 can appear as a visual and an audible indication on unit 82. Also, unit 82 will show the strength of the signal whereby the relative magnitude of the leak in the duct can be established.

In use, reel 16 is mounted on stand 28 in the vicinity of a manhole 84 (FIG. 4) in the ground 86. Below the manhole, a duct 88 is positioned, the duct having an open end 90 and extending generally laterally in the ground as shown in FIG. 4. The duct has a pressurized cable 92 therein.

Rod 14 is unwound from the reel and caused to pass through distance measuring device 44 (not shown in FIG. 4) until the microphone on the front end of the rod is near the open end 90 of duct 88. Then the distance measuring device is set to zero and the microphone and rod are fed into the duct along side pressurized cable 92.

The microphone and rod are forced through the duct until the microphone senses a leak in the pressurized cable 92. This sensing action of the microphone causes an electronic signal to be generated in the coaxial cable in rod 14. The signal is directed back to the reel, through jack 62, plug 64, jack 80, plug 81 and unit 82. Upon noting the indicator on unit 82, it is possible to know when the leak is adjacent to the microphone. The distance to which the rod and microphone have travelled will be immediately noted on device 44 so that excavation of the earth above the leak can commence to permit access to the leak itself for repair purposes. It sometimes is desirable to proceed beyond the location of a first leak to find if additional leaks are in the pressurized cable sheath.

In pulling the rod out of the duct, the rod moves easily because the outer surface of the rod is substantially smooth, assuming that it is a suitable plastic material, such as fiberglass. Any foreign matter adhering to the rods should be removed as it is taken out of the duct and wound back onto reel 16.

Figure 5A:
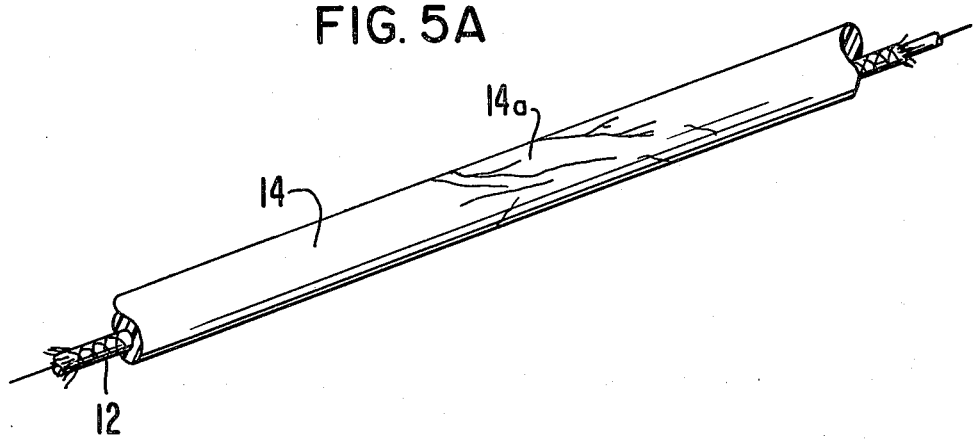
FIGS. 5A-5D are perspective views of the duct probe showing a sequence of steps in the repair of a break in the rod.
Figure 5B:
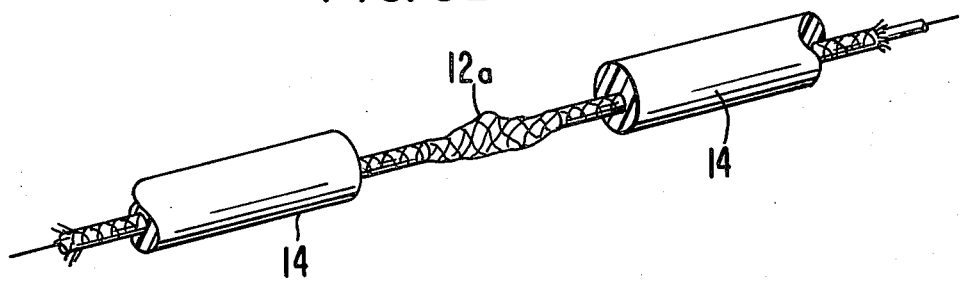
Figure 5C:
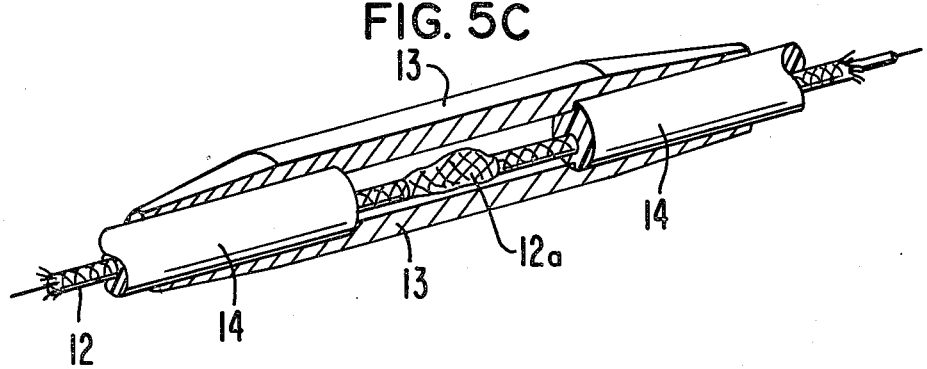
Figure 5D:
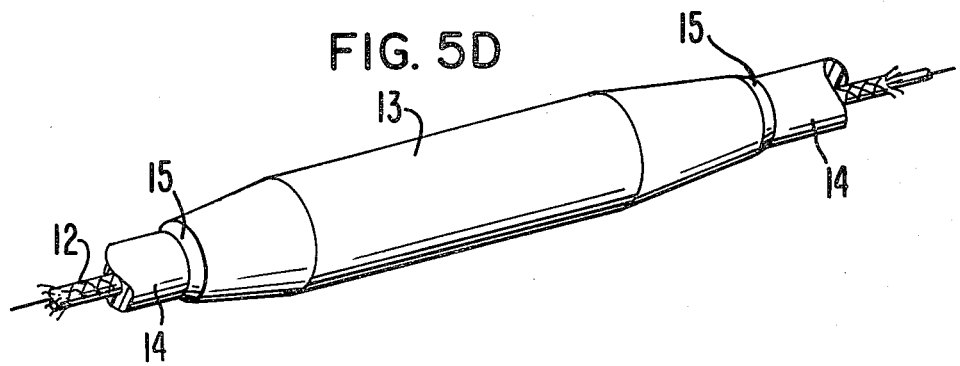

If the rod happens to be flexed by too great an extent, the rod may tend to crack such as in the manner shown in FIG. 5a. If this occurs, a preferred procedure is followed in which the cracked portion 15a of rod 14 is cut away and a stainless steel splicing sleeve 13 is attached to the two ends of the rod in such a way so as to provide a continuous section, both mechanically and electrically. The coaxial cable are provided with a plug and jack unit or are soldered as shown in FIG. 5c at 12a. The ends of the sleeve 13 are secured and sealed against the entrance of moisture by the use of a sealant. In this way, the entire rod or cable need not be replaced and the rod and cable can be repaired at localized areas along the length thereof.

What is claimed is:

1. A duct probe comprising: a resilient rod having a coaxial cable embedded therein and extending longitudinally thereof, the rod having a length sufficient to permit it to be moved into and through a duct adapted to contain a pressurized cable; a support; means rotatably mounting the rod in a coiled relationship on the support, whereby the rod can be unwound and directed into a duct; a sonic sensor at one end of the rod and coupled to the coaxial cable; and means adjacent to the opposite end of the rod for connecting the coaxial cable to a signal indicator unit.

2. A duct probe as set forth in claim 1, wherein the rod has an inherent bias toward a straight line condition.

3. A duct probe as set forth in claim 1, wherein the mounting means for the rod comprises a reel having means for releasably confining the rod in said coiled relationship.

4. A duct probe as set forth in claim 1, wherein said support comprises a stand having a hub and adapted to be mounted on the ground, said mounting means comprising a reel rotatably mounted on the hub of the stand.

5. A duct probe as set forth in claim 4, wherein the reel is removably mounted on the stand.

6. A duct probe as set forth in claim 4, wherein the hub of the stand has a shaft extending downwardly therefrom, the reel having a tubular hub removably mounted on the shaft and rotatable with respect thereto, and means releasably coupling the hub of the reel to the shaft of the stand.

7. A duct probe as set forth in claim 6, wherein the hub of the reel has a plate thereon near the lower end thereof, the plate having a hole therethrough, the shaft extending through the hole of the plate, a bearing between the shaft and the plate, and a nut threadably mounted on the lower end of the shaft, whereby the reel bears against the bearing and is rotatable with respect to the shaft.

8. A duct probe as set forth in claim 1, wherein the rod has a smooth outer surface.

9. A duct probe as set forth in claim 1, wherein the rod is of fiberglass.

10. A duct probe as set forth in claim 1, wherein the sensor is a microphone removably mounted on said one end of the rod.

11. A duct probe as set forth in claim 1, wherein said connecting means has a first part coupled to said mounting means for rotation therewith and a second part coupled to the support, the first and second parts being rotatably coupled to each other.

12. A duct probe as set forth in claim 11, wherein said first part is a plug and the second part is a jack for removably receiving the plug.

13. A duct probe as set forth in claim 11, wherein the mounting means for the rod comprises a reel having a hub, the first part being secured to the hub for rotation therewith, the second part being removably connected to the second part and being stationary with respect thereto.

14. A duct probe as set forth in claim 1, wherein is included a device on the support for measuring the length of the rod unwound from said coiled relationship.

15. A duct probe as set forth in claim 14, wherein said length measuring device has a visual indicator thereon for indicating the length of the rod passing through the device, and means on the device for selectively setting the indicator to a zero reading.

16. A duct probe as set forth in claim 1, wherein the support comprises a stand having a central hub and a shaft depending from the hub, said mounting means for the rod comprising a reel having a hub rotatably mounted on the shaft, said connecting means having a first part and a second part, the second part being secured to the hub of the reel for rotation therewith, the first part being fixed relative to the second part.

17. A duct probe as set forth in claim 16, wherein the hub is tubular and has a first plate provided with a hole therethrough for receiving the shaft of the stand, bearing means coupling the shaft to the first plate, the hub having a second plate, the second part of the connecting means comprising a jack coupled to the second plate, the first part of the connecting means comprising a plug removably mounted in the jack.

18. A duct probe as set forth in claim 16, wherein is included means on the stand for measuring the length of the rod unwound from the reel.

19. A duct probe as set forth in claim 16, wherein the reel has means movably confining the rod thereon in coiled relationship thereto.

20. A duct probe as set forth in claim 16, wherein the reel is comprised of a tubular hub, a number of J-shaped arms radiating from the hub, a first, circular, rigid band secured to the outer peripheral extremities of the arms, and a second circular rigid band secured to the ends of the arms to present a top opening through which the rod can pass as it is wound onto and unwound from the reel.

21. A support for an elongated, resilient rod comprising: a stand adapted to be mounted on the ground and having a hub and a number of legs for engaging the ground, the hub being spaced above the ground when the legs engage the ground; a reel below the hub and adapted to receive and to support the rod in a coiled relationship on the reel; and means coupling the reel to the hub of the stand for rotation relative to the stand to permit the rod to be wound onto and to be unwound from the reel as the reel rotates relative to the stand.

22. A support as set forth in claim 21, wherein the legs of the stand are L-shaped, each leg having a first, generally horizontal segment secured to and radiating from the hub of the stand and a second, generally vertical segment extending outwardly from the outer end of the first segment, the reel being in the space below the hub and defined by the vertical segments of the legs.

23. A support as set forth in claim 21, wherein the stand has a shaft secured to and extending downwardly from the hub of the stand, said reel having a hub rotatably mounted on the shaft, and means for coupling the hub to the shaft.

24. A support as set forth in claim 23, wherein the hub of the reel is tubular and has a plate provided with a hole therethrough, the shaft extending through the hole in the plate, a bearing carried by the shaft and engaging the lower surface of the plate, and a nut secured to the shaft for holding the hub of the reel on the shaft.

25. A support as set forth in claim 21, wherein the reel has cage means thereon for releasably confining the rod in a coiled relationship on the reel.

26. A support as set forth in claim 21, wherein the reel has a central hub, a plurality of J-shaped legs secured to and radiating from the hub, a first, circular rigid band secured to the outer peripheral extremities of the arm, and a second, circular, rigid band secured to the outer ends of the arms to present an opening through which the rod can pass as it is wound onto and unwound from the reel.

* * * * *